United States Patent
Low

(10) Patent No.: US 8,679,222 B2
(45) Date of Patent: Mar. 25, 2014

(54) PROCESS FOR PRODUCING SPONGE IRON

(75) Inventor: Kin Onn Low, Petaling Jaya (MY)

(73) Assignee: IOP Specialists SDN. BHD., Klang (MY)

( * ) Notice: Subject to any disclaimer, the term of this patent is extended or adjusted under 35 U.S.C. 154(b) by 167 days.

(21) Appl. No.: 13/262,614

(22) PCT Filed: Mar. 26, 2010

(86) PCT No.: PCT/MY2010/000036
§ 371 (c)(1), (2), (4) Date: Dec. 12, 2011

(87) PCT Pub. No.: WO2010/114355
PCT Pub. Date: Oct. 7, 2010

(65) Prior Publication Data
US 2012/0100034 A1 Apr. 26, 2012

(30) Foreign Application Priority Data
Mar. 31, 2009 (MY) ................ PI 20091296

(51) Int. Cl.
*C21B 13/00* (2006.01)
*C21B 13/14* (2006.01)
*C22C 38/00* (2006.01)
*B22F 9/20* (2006.01)

(52) U.S. Cl.
USPC ............... 75/504; 75/751; 75/765; 75/770

(58) Field of Classification Search
USPC ................ 75/765, 770, 751, 504
See application file for complete search history.

(56) References Cited

U.S. PATENT DOCUMENTS

| | | | | |
|---|---|---|---|---|
| 3,556,772 A | * | 1/1971 | Rausch et al. | 75/436 |
| 3,922,165 A | * | 11/1975 | Harker et al. | 75/484 |
| 5,865,875 A | | 2/1999 | Rinker et al. | |
| 6,488,737 B1 | * | 12/2002 | Monteyne | 75/414 |
| 6,918,947 B2 | * | 7/2005 | Maki et al. | 75/484 |
| 2005/0193862 A1 | * | 9/2005 | Suzuki et al. | 75/469 |
| 2007/0245855 A1 | * | 10/2007 | Zendejas-Martinez | 75/496 |

FOREIGN PATENT DOCUMENTS

| | | |
|---|---|---|
| CA | 2254220 A1 | 5/1999 |
| EP | 1160336 A1 | 12/2001 |
| FR | 1591340 A | 4/1970 |
| SU | 1677065 A1 | 9/1991 |

OTHER PUBLICATIONS

Derwent Acc No. 2004-496512 for patent family including RU 2231420 C1 by Akimenko et al published Jun. 27, 2004.*

* cited by examiner

*Primary Examiner* — George Wyszomierski
*Assistant Examiner* — Tima M McGuthry Banks
(74) *Attorney, Agent, or Firm* — Mashoff Brennan

(57) ABSTRACT

The process for producing the sponge iron includes the steps of preparing a sandwich of at least two layers wherein the at least two layers includes a first layer (10) of iron oxide source which content is carbon free or comprises of only self-contaminant carbon or carbonaceous and second layer (12) is a mixture of iron oxide source and carbon source and subjecting the sandwich of at least two layers to a pyrolysis process in a non-oxidative environment at temperature between 950° C. to 1900° C. for a period between 10 minutes to 36 hours. The carbon source in the second layer (12) is equal to or more than stoichiometric weight of carbon according to a predominant reaction. The non-oxidative pyrolysis occurs in a reactor. The sandwich of two layers is placed in a moving carrier (16) such as tray to accommodate the sandwich of two layers in the reactor.

24 Claims, 1 Drawing Sheet

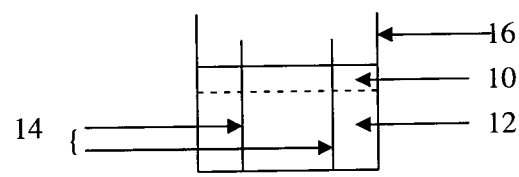

PROCESS FOR PRODUCING SPONGE IRON

FIELD OF INVENTION

The present invention relates to process for producing sponge iron.

BACKGROUND ART OF THE INVENTION

Sponge iron is an important iron and steel feedstock. Sponge iron is a metallic iron consisting of powder or porous structure. Commercial production of the sponge iron can be generally divided into two types; the coal and the gas processes. Reduction of iron ore can be achieved by using either carbon bearing material, such as non-coking coal or a suitable reducing gas in the form of reformed natural gas. The processes employing coal are known as solid-reluctant of coal-based processes while those employing reducing gases are known as gas-based processes. Sponge iron produced by gas-based process is normally hot briquette and hence it is also known as Briquette Iron (HBI). Sponge iron, also called direct reduced iron, is the product created when iron ore is reduced to metallic iron, usually with carbon (charcoal), at temperatures below melting point of iron. Currently, problem faced by manufacturers in producing the sponge iron is that the carbon content in the sponge iron is difficult to be altered or to be produced in desirable carbon content. This situation occurs in both the coal and gas processes. In the gas based process, iron oxide source is introduced in a bulky amount into a furnace for a reduction process to produce sponge iron. The sponge iron produced at the end of the reduction process generally contains high carbon content of 4-6%. In order to reduce the carbon content, it is subjected to a subsequent process of controlled oxidation wherein, the carbon content is further reduced. This further increases cost of the production of the sponge iron.

Conventional sponge iron possesses high carbon content as a result of the carbon is inherently dissolvable in the metallic iron during the production. 4-6% carbon is generally present in the conventional sponge iron and manufacturers are finding all the way to reduce its carbon content. Effort of carbon removal is carry out all the time and one of it is the increase of oxygen partial pressure in the gas-process. However, not many breakthrough of technology was obtained for the removal of carbon effectively and efficiently.

Therefore, there is a need for a process for producing sponge iron which allows the alteration of carbon content that is desired in the sponge iron and also to have a process that reduces carbon content effectively and efficiently.

SUMMARY OF THE INVENTION

The present invention relates to a process for producing sponge iron, wherein the process includes the steps of preparing a sandwich of at least two layers wherein the at least two layers includes a first layer of iron oxide source and second layer of a mixture of iron oxide source and carbon source and subjecting the sandwich of at least two layers to a heating process in a non-oxidative environment at a temperature between 950° C. to 1900° C. The carbon source in the second layer is equal to or more than stoichiometric weight of carbon according to a predominant reaction. The sponge iron consists of powder or porous structure. The predominant reaction is determined based on the iron oxide source. The iron oxide source is carbon free or the iron oxide source comprises of only self contaminant carbon or carbonaceous source. The sandwich of two layers is placed in a moving carrier and moved to a reactor for the heating process. At least one layer of organic material or at least one heat conductor is placed in between the sandwich of at least two layers in the moving carrier. The at least one layer organic material is burnt off at temperature range between 950° C. to 1900° C. The organic material (14) is selected from cartoon paper (any organic fibrous materials), timber plate (any wooden materials), plastics (any polymeric materials) or carbon block (any carbonaceous substance). The at least one heat conductor is selected from a metal or silicon carbide. The iron oxide source is selected from millscale powder, hematite powder, magnetite powder, ferric oxide, steel slag, iron oxide produced from waste water treatment or any combination thereof. The carbon source is selected from coal powder, charcoal powder, wood debris, carbonaceous substance from printing ink's waste water treatment or any combination thereof. Thickness of the first layer is relative to thickness of the second layer such that overall weight of the carbon in the sandwich is equal to or below stoichiometric weight of carbon according to the predominant reaction. The process for producing sponge iron further includes a step of pulverizing the sponge iron produced above and heating the pulverized sponge iron at temperature between 950° C. to 1900° C. for a period between 10 minutes to 36 hours. This further step can be repeated for at least one cycle.

The present invention also relates to a process for producing sponge iron, wherein the process includes the steps of mixing iron oxide source and carbon source wherein the carbon source is equal or more than stoichiometric weight of carbon according to a predominant reaction and subjecting the mixture to a heating process in a non-oxidative environment at temperature between 950° C. to 1900° C. The sponge iron consists of powder or porous structure. The mixture is placed in a moving carrier and moved to a reactor for heating process. At least one organic material or at least one heat conductor is placed in between the mixture in the moving carrier. The iron oxide source, carbon source, the at least one layer of organic material and at least one heat conductor are selected respectively as mentioned above.

BRIEF DESCRIPTION OF THE DRAWINGS

The present invention will become more fully understood from the detailed description given herein below and accompanying drawings which are given by way of illustration only, and thus are not limitative of the present invention, wherein:

FIG. 1 shows a carrier which consists of a sandwich of at least two layers, i.e. first layer of iron oxide source and a second layer of a mixture of iron oxide source and carbon source for producing the sponge iron.

DETAILED DESCRIPTION OF THE INVENTION

The present invention relates to a process for producing sponge iron and in-situ carbon removal. The present invention also provides flexibility to producers where the sponge iron of varying carbon content can be obtained desirably. A detailed description of preferred embodiments of the invention is disclosed herein. It should be understood, however, that the disclosed preferred embodiments are merely exemplary of the invention, which may be embodied in various forms. Therefore, the details disclosed herein are not to be interpreted as limiting, but merely as the basis for the claims and for teaching one skilled in the art of the invention.

The process for producing the sponge iron includes raw materials such as iron oxide source and carbon source with the use of carbon source at minimum level. Optimum production of the sponge iron occurs at stoichiometric amount of carbon and this largely reduces cost of the raw materials. The process for producing the sponge iron includes the first step of preparing a sandwich of at least two layers and subjecting the said sandwich of the at least two layers under a non-oxidative pyrolysis process in a reactor at temperature between 950° C. to 1900° C. for a period between 10 minutes to 36 hours. The sandwich of at least two layers includes a first layer (10) and a second layer (12). The first layer (10) consists of a layer of iron oxide source which content is carbon free or comprises of only self-contaminant carbon or carbonaceous source. The iron oxide which content is self-contaminant carbon is known to art and will not be further described. The second layer (12) consists of a mixture of iron oxide source and carbon source in which the amount of carbon must be equal to or more than stoichiometric weight of carbon, according to a predominant reaction, so that reduction of iron oxide to form metallic iron can begin. The iron oxide source can be selected from millscale powder, hematite powder, magnetite powder, ferric oxide, steel slag, iron oxide produced from waste water treatment or any combination thereof. The carbon source can be selected from coal powder, charcoal powder, wood debris, carbonaceous substance from printing ink's waste water treatment or any combination thereof.

The sandwich of the at least two layers is placed in a moving carrier (16) such as tray to accommodate the sandwich of the at least two layers in the reactor. During the pyrolysis at non-oxidative environment, temperature between 950° C. to 1900° C., metallic iron (Fe) is obtained by reduction wherein the iron oxide source is reduced by the carbon source. As a result of removal of oxygen atoms from the iron oxide source, the metallic iron so extracted is porous and hence it is called sponge iron.

Thickness of the first layer (10) relative to the second layer (12) is such that overall weight of the carbon in the sandwich of the at least two layers is equal to or below stoichiometric weight of carbon according to a predominant reaction. In the case of the overall weight of carbon is equal to the stoichiometric weight, the thickness of the first layer (10) is zero. For maximum level of carbon removal and for shorter processing time, at least one layer of organic material (14) or at least one heat conductor can be placed into the sandwich as a divider so that when the at least one layer of organic material burnt off at processing temperature between 950° C. to 1900° C., it will vacant local area to allow better heat supply to the sandwich from heating source during the process thereby to increase rate of carbon removal or in the other hand to increase the rate of iron extraction reaction in order to produce the sponge iron. The local area is the area where the at least one layer of organic material placed at the beginning of the process in the sandwich. As for the at least one heat conductor, it will allow better heat supply to the sandwich from a heating source which increases rate of carbon removal and rate of iron extraction to produce sponge iron. The at least one layer of the organic material can be selected from cartoon paper (any organic fibrous materials), timber plate (any wooden materials), plastics (any polymeric materials) or carbon block (any carbonaceous substance). The at least one heat conductor can be selected from strips of iron, steels, other metals or silicon carbide. After the pyrolysis process, the at least one conductor can be removed from the sponge iron.

Unreduced iron oxide in the first layer may not necessarily be removed after the non-oxidative pyrolysis process and the resulted sponge iron produced after the non-oxidative pyrolysis process is then pulverized and heated at same condition as mentioned above in the non-oxidative the pyrolysis process for a second cycle process. More cycles of processing can be conducted for the objective to increase production yield per unit heating time and to remove more carbon content in the sponge iron that is produced. In the present invention production of 1 metric ton sponge iron requires only 0.17 metric ton of coal powder. In calculation, the amount of 0.17 metric ton is just the stoichiometric amount of the carbon necessary for extraction of the sponge iron from millscale powder.

Compared to conventional method, production of 1 metric ton sponge iron requires 1.5 metric ton of iron ore powder and 1.2 metric ton of coal powder. The present invention is further described in the examples below.

Another embodiment of the present invention relates to a process of producing sponge iron without the need of preparing a sandwich of at least two layers. This embodiment relates to a process that includes the steps of mixing iron oxide source and carbon source wherein amount of carbon must be equal or more than the stoichiometric weight of carbon according to a predominant reaction and subjecting the mixture to a non-oxidative pyrolysis process in a non-oxidative environment at temperature between 950° C. to 1900° C. for a period between 10 minutes to 36 hours. The mixture is placed in a moving carrier (16) and moved to a reactor for the pyrolysis process. At least one layer of organic material (14) or at least one heat conductor as described in the earlier embodiment is optionally placed in between the mixture in the moving carrier (16) as a divider so that when the at least one layer of organic material burnt off at processing temperature between 950° C. to 1900° C., it will vacant local area to allow better heat supply to the sandwich during the process thereby to increase rate of iron extraction reaction in order to produce the sponge iron.

The predominant reaction of the extraction of sponge iron is determined by the source of iron oxides. If the source of iron oxide is predominantly millscale; the predominant reaction shall be

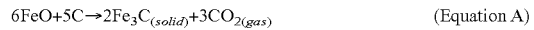

$$6FeO + 5C \rightarrow 2Fe_3C_{(solid)} + 3CO_{2(gas)} \quad \text{(Equation A)}$$

If the source of iron oxide is predominantly magnetite iron ore ($Fe_3O_4$); the predominant reaction shall be

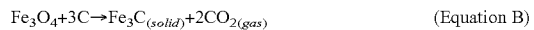

$$Fe_3O_4 + 3C \rightarrow Fe_3C_{(solid)} + 2CO_{2(gas)} \quad \text{(Equation B)}$$

If the source of iron oxide is predominantly hematite iron ore ($Fe_2O_3$); the predominant reaction shall be

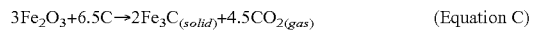

$$3Fe_2O_3 + 6.5C \rightarrow 2Fe_3C_{(solid)} + 4.5CO_{2(gas)} \quad \text{(Equation C)}$$

Determination of the predominant reaction shall be based on opinion of the source of iron oxides and an averaging method could be applied if it is judged that the iron oxide source consisting of more than one type of iron oxides; example, in case of an equal proportion mixture of hematite and magnetite; the calculation should use an average result of the predominant reactions of Equations B and C.

Examples of the present invention are described herein.

EXAMPLE 1

Sandwich of two layers includes of 2000 g second layer (12) of mixture of 86.21% pure millscale powder of 200 mesh and 13.79% charcoal powder of 200 mesh. The first layer (10) of the sandwich is made up of 260 g technical pure millscale powder. The sandwich is placed in a carrier (16) and then introduced in a reactor. The sandwich is then heated at a processing condition of 1150° C. for 30 minutes in a reactor under non-oxidative environment. Product sample after the heating is collected for analysis. The heating herein is referred to a first cycle of heating. After the analysis, the product sample is then pulverized and placed in the reactor for a second cycle of heating process at 1150° C. and 30 minutes under non-oxidative environment. The product sample after the second cycle process is then collected for analysis. The product sample after the first cycle heating and second cycle heating is sponge iron. The sponge iron produced has a weight about 75% of the initial weight of the sandwich of two layers.
Result:
In calculation, since millscale content is predominantly FeO and coal is predominantly carbon, the overall predominant reaction (first cycle) at 1150° C. and 30 minutes is:

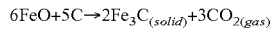

$$6FeO + 5C \rightarrow 2Fe_3C_{(solid)} + 3CO_{2(gas)}$$

In this predominant reaction, the stoichiometric amount of carbon (charcoal) is 12.2% in the sandwich. The overall carbon content of the sandwich is thus 2000 g×0.1379/2260 g or 12.2% which equals to the stoichiometric amount.
Result:
After First Cycle:
The sponge iron extracted by this method possessed 82% of total iron and 6% of carbon present in the form of $Fe_3C$ and free carbon. In the first layer of the sandwich, it is visually inspected that about 50% of the millscale powder being reduced to become metallic iron and those iron are "fused" or dissolved in the second layer.
After Second Cycle:
The sponge iron extracted by this method possessed 92% total iron and 4% carbon present mainly in the form of $Fe_3C$.
Conclusion:
The pure millscale powder in the first layer of the first cycle absorbed some of the carbon from the second layer and was being partially reduced to metallic iron. In the first cycle, the processing condition was effective to extract sponge iron but, as a result of shorter time, level of metallization was not satisfactory and this was further improved in the second cycle.

EXAMPLE 2

The two layers of sandwich as per example 1 is repeated with an addition of two layers of 1.5 mm thickness paper as organic material (14) in between the sandwich in the moving carrier (16) and subjected to two cycles as in example 1.
Result:
After First Cycle:
The sponge iron extracted by this method possessed 86% total iron and 4% carbon present in the form of $Fe_3C$ and free carbon. In the first layer of the sandwich, it is visually inspected that about 50% of the millscale powder being reduced to become metallic iron and those iron are "fused" or dissolved in the second layer.
After Second Cycle:
The sponge iron extracted by this method possessed 94% total iron and 1.5% carbon present mainly in the form of $Fe_3C$.
Conclusion:
The paper as the organic material (14) dividers was effective to increase the rate of extraction reaction and also to reduce the level of carbon in the sponge iron.

EXAMPLE 3

In a separate processing condition, stoichiometric amount of carbon to be mixed with the millscale powder according to the predominant equation, i.e. 12.2% coal powder and 87.8% millscale powder. The mixture was heated in non-oxidative environment at 1150° C. for 75 minutes. In this process, no sandwich of raw materials was used and no organic material or heat conductor was inserted into the sandwich in the moving carrier (16) during the processing. Also, the heating was only done for one cycle.
Result:
The sponge iron extracted possessed 93% total iron and 3.5% carbon, which was present mainly in the form of $Fe_3C$.
Conclusion:
Sponge iron extracted to a satisfactory level when just the stoichiometric amount of coal is used. However, carbon content was slightly higher and this obviously could be reduced by co-processing with inserting of organic material (14) in the moving carrier (16).

Therefore the present invention provides an efficient way for producing sponge iron and easy way of carbon removal and this can be done at an in-situ condition, which is during the process for producing the sponge iron. This largely increased production yield and in the same time maintains the sponge iron quality.

The invention claimed is:
1. A process for producing sponge iron, the process includes the steps of:
   i) preparing a sandwich of at least two layers wherein the at least two layers includes a first layer of an iron oxide source and second layer of a mixture of an iron oxide source and carbon source;
   ii) subjecting the sandwich of at least two layers in step (i) to a heating process in a non-oxidative environment at a temperature between 950° C. to 1900° C. so that a predominant reaction occurs between iron oxide in the iron oxide source and carbon in the carbon source to produce said sponge iron, said predominant reaction dependent on a predominant oxidation state of the iron oxide; and
   wherein the carbon source in the second layer is equal to or more than stoichiometric weight of carbon necessary to reduce said iron oxide according to said predominant reaction; and
   wherein the sandwich of the at least two layers is placed in a moving carrier and moved to a reactor for the heating process.
2. The process for producing sponge iron as claimed in claim 1 wherein the sponge iron consists of powder or porous structure.
3. The process for producing sponge iron as claimed in claim 1 wherein the iron oxide source is carbon free.
4. The process for producing sponge iron as claimed in claim 1 wherein the iron oxide source comprises only self contaminant carbon or carbonaceous substance.
5. The process for producing sponge iron as claimed in claim 1 wherein thickness of the first layer is relative to thickness of the second layer such that overall weight of the carbon in the sandwich is equal to or below stoichiometric weight of carbon according to the predominant reaction.
6. The process for producing sponge iron as claimed in claim 1 wherein the at least one layer of organic material or at least one heat conductor is placed in between the sandwich of at least two layers in the moving carrier.
7. The process producing sponge iron as claimed in claim 6 wherein the at least one layer of organic material is selected from a group consisting of organic fibrous materials, wooden materials, polymeric materials and carbonaceous substance.
8. The process producing sponge iron as claimed in claim 6 wherein the at least one heat conductor is selected from a group consisting of metals and silicon carbide.
9. The process for producing sponge iron as claimed in claim 6 wherein the at least one layer of organic material is burnt off at temperature range between 950° C. to 1900° C.

10. The process for producing sponge iron as claimed in claim 6, wherein the at least one layer that is placed in between the sandwich of at least two layers is the organic material.

11. The process for producing sponge iron as claimed in claim 6, wherein the at least one layer that is placed in between the sandwich of at least two layers is the heat conductor.

12. The process for producing sponge iron as claimed in claim 1 wherein the iron oxide source is selected from a group consisting of millscale powder, hematite powder, magnetite powder, ferric oxide, steel slag, iron oxide produced from waste water treatment and any combination thereof.

13. The process for producing sponge iron as claimed in claim 1 wherein the carbon source is selected from a group consisting of coal powder, charcoal powder, wood debris, carbonaceous substance from printing ink's waste water treatment and any combination thereof.

14. The process for producing sponge iron as claimed in claim 1 wherein the process further includes a step of pulverizing the sponge iron produced after step (ii) and heating the pulverized metallic iron at temperature between 950° C. to 1900° C. for a period of 10 minutes to 36 hours.

15. The process for producing sponge iron as claimed in claim 14 wherein the process is repeated for at least one time.

16. A process for producing sponge iron wherein the process includes the steps of:
   i) mixing iron oxide source and carbon source wherein the carbon source is equal to or more than stoichiometric weight of carbon necessary to reduce said iron oxide;
   ii) subjecting mixture in step (i) to a heating process in a non-oxidative environment at temperature between 950° C. to 1900° C. so that a predominant reaction occurs between iron oxide in the iron oxide source and carbon in the carbon source to produce said sponge iron, said predominant reaction dependent on a predominant oxidation state of the iron oxide; and
   wherein the mixture in step (i) is placed in a moving carrier and moved to a reactor for the heating process.

17. The process for producing sponge iron as claimed in claim 16 wherein the sponge iron consists of powder or porous structure.

18. The process for producing sponge iron as claimed in claim 16 wherein the iron oxide source is selected from a group consisting of millscale powder, hematite powder, magnetite powder, ferric oxide, steel slag, iron oxide produced from waste water treatment and any combination thereof.

19. The process for producing sponge iron as claimed in claim 16 wherein the carbon source is selected from a group consisting of coal powder, charcoal powder, wood debris, carbonaceous substance from printing ink's waste water treatment and any combination thereof.

20. The process for producing sponge iron as claimed in claim 16 wherein the at least one layer of organic material or at least one heat conductor is placed in between the mixture of iron oxide source and carbon source in the moving carrier.

21. The process producing sponge iron as claimed in claim 20 wherein the at least one layer of organic material is the layer placed in between the mixture of iron oxide source and carbon source, and is selected from a group consisting of organic fibrous materials, wooden materials, polymeric materials and carbonaceous substance.

22. The process producing sponge iron as claimed in claim 20 wherein the at least one heat conductor is the layer placed in between the mixture of iron oxide source and carbon source, and is selected from a group consisting of metal and silicon carbide.

23. A process for producing sponge iron, the process includes the steps of:
   i) preparing a sandwich of at least two layers wherein the at least two layers includes a first layer of an iron oxide source and second layer of a mixture of an iron oxide source and carbon source, wherein the first layer is devoid of a carbon source;
   ii) subjecting the sandwich of at least two layers in step (i) to a heating process in a non-oxidative environment at a temperature between 950° C. to 1900° C. so that a predominant reaction occurs between iron oxide in the iron oxide source and carbon in the carbon source to produce said sponge iron, said predominant reaction dependent on a predominant oxidation state of the iron oxide; and
   wherein the carbon source in the second layer is equal to or more than stoichiometric weight of carbon necessary to reduce said iron oxide according to said predominant reaction.

24. The process for producing sponge iron as claimed in claim 23 wherein:
   the iron oxide source is selected from a group consisting of millscale powder, hematite powder, magnetite powder, ferric oxide, steel slag, iron oxide produced from waste water treatment and any combination thereof; or
   the carbon source is selected from a group consisting of coal powder, charcoal powder, wood debris, carbonaceous substance from printing ink's waste water treatment and any combination thereof.

* * * * *

UNITED STATES PATENT AND TRADEMARK OFFICE
CERTIFICATE OF CORRECTION

PATENT NO.       : 8,679,222 B2                            Page 1 of 1
APPLICATION NO.  : 13/262614
DATED            : March 25, 2014
INVENTOR(S)      : Kin Onn Low It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 241 days.

Signed and Sealed this
Twenty-ninth Day of September, 2015

Michelle K. Lee
*Director of the United States Patent and Trademark Office*